United States Patent [19] [11] 4,018,507
Raghavan [45] Apr. 19, 1977

[54] LIQUID CRYSTAL DEVICE, COMPOSITION THEREFOR, AND METHOD FOR PREPARING THE COMPOSITION

[75] Inventor: N.V. Vijaya Raghavan, Mountain View, Calif.

[73] Assignee: American Micro-Systems, Inc., Santa Clara, Calif.

[22] Filed: Sept. 5, 1974

[21] Appl. No.: 503,241

[52] U.S. Cl. .................. 350/160 LC; 252/299; 260/566 D
[51] Int. Cl.² .................. G02F 1/13; C09K 3/34
[58] Field of Search .............. 252/408 LC, 299; 350/160 LC, 150

[56] References Cited
UNITED STATES PATENTS

| | | | |
|---|---|---|---|
| 3,795,436 | 3/1974 | Boller et al. | 252/408 LC |
| 3,796,479 | 3/1974 | Helfrich et al. | 252/408 LC |
| 3,815,972 | 6/1974 | Hsieh | 252/299 |
| 3,853,785 | 12/1974 | Labes | 252/408 LC |
| 3,872,140 | 3/1975 | Klanderman et al. | 252/408 LC |
| 3,880,767 | 4/1975 | Chang et al. | 252/299 |

FOREIGN PATENTS OR APPLICATIONS

| | | | |
|---|---|---|---|
| 2,365,226 | 7/1974 | Germany | 350/160 LC |
| 49-130882 | 12/1974 | Japan | 252/299 |

*Primary Examiner*—Benjamin R. Padgett
*Assistant Examiner*—T. S. Gron
*Attorney, Agent, or Firm*—Owen, Wickersham & Erickson

[57] ABSTRACT

A nematic liquid crystal composition comprises a fluorinated Schiff base of the general formula, X—Ph—HC=N—Ph—F, where X is an alkyl, acyl, acyloxy or alkoxy group having from 1 to 10 carbon atoms, and a p-alkoxy benzylidene-p-alkyl aniline, if desired with a small amount of a p-alkoxy benzylidene-p-cyanoaniline. An electro-optical device comprises a container for a layer of the liquid crystal composition described, a layer of such composition therein, and means to supply a current across all or a selected or predetermined area of such layer to cause alignment of the liquid crystals. Methods of making the fluorinated Schiff base, the liquid crystal composition and the device are provided.

16 Claims, 2 Drawing Figures

CONTRAST RATIO VERSUS VOLTAGE, TWISTED NEMATIC FIELD EFFECT DISPLAYS. CURVE (a) IS THE LOW-VOLTAGE DISPLAY OF THE INVENTION. CURVE (b) IS A TYPICAL 6-9 VOLT DISPLAY OF THE PRIOR ART.

LIQUID CRYSTAL DEVICE, COMPOSITION THEREFOR, AND METHOD FOR PREPARING THE COMPOSITION

BACKGROUND OF THE INVENTION

This invention relates to the production of nematic liquid crystal compositions and to articles or devices including such compositions; and, more particularly, it concerns novel Schiff bases which are useful in producing such nematic liquid crystal compositions and articles, and methods of making the same.

Nematic liquid crystals have heretofore been known to the art, along with light valves, light modulators and display devices utilizing such crystals. These devices are operated by application of an electric field to the composition when it is in the mesomorphic state and when an electric field, or current, of sufficient strength is applied to the liquid crystal composition, the layer of crystals appears to change, for instance in the intensity of transmitted light, in the area of the effective field. The nematic liquid crystal domains align themselves in the applied field. However, some of the prior art nematic liquid crystal compositions have had a mesomorphic range above normal room temperatures and have required heating in order to bring them into a useful state; and others have had a small or narrow temperature range in which they are in the liquid crystal state. Another disadvantage has been the necessity for using a relatively large electrical voltage and current to cause suitable alignment of the nematic liquid crystals in a device.

The above disadvantages are overcome and certain advantages are attained by the present invention as will be shown below.

SUMMARY OF THE INVENTION

The fluoroaniline Schiff bases or anils according to this invention and useful in the nematic liquid crystal compositions herein, have the general formula:

X—PhHC=N—Ph—F, wherein X is a radical or group chosen from the group consisting of alkoxy, acyloxy, alkyl and acyl groups each containing from 1–10 carbon atoms, and where Ph is phenyl, $C_6H_4$, and F is fluorine.

The fluoroaniline Schiff bases of this invention are synthesized by condensing the appropriate benzaldehyde derivative with p-fluoraniline in a suitable solvent such as benzene, toluene or heptane. As starting aldehydes there can be used, in making the fluoroaniline Schiff bases of this invention, for example, p-methoxy benzaldehyde, p-ethoxy benzaldehyde, p-tolualdehyde, p-heptyloxy benzaldehyde, p-octyloxybenzaldehyde, para-capryl benzaldehyde, p-butyroyl benzaldehyde and the like.

The fluoroaniline Schiff base compounds are suitably made by the condensation mentioned above, wherein the benzaldehyde derivative and the p-fluoroaniline are mixed together, along with the solvent. Benzene is a preferred solvent, being readily available, inexpensive and easy to use, but there can alternatively be used any other desired solvent for the reactants. The fluoroaniline Schiff base-producing mixture is then heated to effect reaction, for example, by refluxing for from 3 to 10 hours, or until the reaction is completed as indicated by the amount of water collected and removed by azeotropic distillation. The solvent is then evaporated off and the desired anil recovered as residue. The aldehyde and fluoroaniline components are mixed together in molar equivalents, although an excess of either can be used.

A nematic liquid crystal composition according to this invention comprises an admixture of (A) at least one p-alkoxybenzylidene-P-alkylaniline, such as p-alkoxy benzylidene-p-n-butyl aniline wherein the alkoxy group can contain from 1 to 8 carbon atoms and (B) at least one fluorinated Schiff base of the general formula X—Ph—CH=N—Ph—F as described above. In addition to the p-alkoxy benzylidene-p-n-butylaniline there can be employed p-alkoxy benzylidene-p-cyanoaniline, especially p-ethoxy-benzylidene-p-cyano aniline.

The compounds can be admixed in any desired proportion, suitably from 90% to 60% of the (A) component p-alkoxy benzylidene-p-alkyl aniline and from 10% to 40% of the B component, X—Ph—HC=N—Ph—F, the fluorinated Schiff base of this invention. A preferred operative proportion of the fluorinated Schiff base is around 27%. The fluorinated Schiff base can be present in an amount of from 15% to less than 50% in some embodiments.

These compounds are mixed together and are heated until completely liquid, with vigorous agitation to form a homogeneous isotropic liquid. Such liquid is then cooled to room temperature. A nematic liquid crystal composition is then obtained which has substantially improved properties as compared with such compositions of the prior art. If desired, this composition could be cooled to the solid state for storage, shipping etc. and then heated to its nematic liquid crystal state for use.

It has been found that the nematic liquid crystal composition of this invention has improved electrical characteristics in that it draws substantially less current than the heretofore available nematic liquid crystal compositions and the liquid crystals herein obtained spontaneously align themselves very speedily under the field effect. Lower voltages are required to provide the necessary field effect in devices using the liquid crystals of this invention. Further, the compositions of this invention exist in the devised mesomorphic state at low temperatures, i.e. at about ambient temperatures, and remain in this state over a wide range of temperatures; thus enabling more versatile utilization.

An electro-optical or light-modulating device, or light valve, according to this invention comprises a nematic liquid crystal mixture of a p-alkoxy benzylidene-p-alkyl aniline such as MBBA and a fluorinated Schiff base of the formula X—PhHC=N—Ph—F, wherein X is a radical selected from the group consisting of alkyl, acyl, alkoxy and acyloxy radicals each containing from 1–10 carbon atoms, and also a means to cause an electrical field to be applied across a film of such liquid crystal mixture. The mixture is of the composition as described hereinabove and is adapted to provide a display with employment of only a very low voltage, typically around 3 volts. In addition it draws an exceptionally low current, which is most important for such applications as electronic timepieces.

The display device in one embodiment includes a pair of planar elements as front and back walls. One or both can be transparent, and one can be reflective, depending upon whether the light is to be transmitted or reflected. Suitable conductors, which are transparent, are placed inside the front and back walls, respectively, and adjacent to the liquid crystal mixture, and connected to a voltage source. The liquid crystal mixture is placed in the device by suction or capillary flow, the two planar elements being separated by a glass frit seal and being closed at the fill hole, for instance by a seal of epoxy resin. The device or cell is thin so as to provide a thin layer of the liquid crystal composition and the electrodes can be arranged to provide an electric field over all or only predetermined areas of such layer. Such a display device can be used in television, time displays, etc. It will be understood that polarizers or other such adjuncts are to be used with the device. A source of light is provided to direct a light beam through a transparent wall of the device, and when the exciting voltage is applied, the device displays the desired pattern or information, in the known way.

DETAILED DESCRIPTION OF THE INVENTION

The following specific examples are given by way of illustration only of the mode of carrying out the present invention and of the products obtained thereby.

The Schiff bases can be produced as shown below:

EXAMPLE I

To 1.50 grams of p-ethoxy benzaldehyde is added 1.11 grams of freshly distilled p-fluoroaniline and 100 ml of benzene. The mixture is refluxed for 3.5 hours and the water is azeotropically removed using Dean-Stark apparatus. At the end of this time the reaction is complete. The solvent is removed under reduced pressure using a rotary evaporator. The residue is recrystallized twice from methanol. Yield is about 2.0 grams (85%) m.pt 77°–78° C.

EXAMPLE II

A solution of 1.20 grams of p-tolualdehyde and 1.11 grams of p-fluoroaniline in 100 ml of benzene is refluxed for 10 hours. The water is removed azeotropically as in Example I using Dean-Stark apparatus. After the reaction is complete the solvent is removed under reduced pressure and the residue is recrystallized twice from heptane. Yield is about 1.65 grams (81%) m.pt 67°–68° C.

The following examples illustrate the field effect liquid crystal compositions and methods of making them.

EXAMPLE III

To 1.0 gram of p-methoxy benzylidene-p-n-butylaniline (MBBA) 0.25 gram of p-ethoxy benzylidene-p-fluoroaniline is added and heated to about 75° C. until the solution becomes clear. The solution is then cooled to room temperature. This composition has a nematic range from +8° to +47° C.

EXAMPLE IV

The same procedure was followed using 0.8 gram of p-methoxy benzylidene-n-butylaniline and 0.2 gram of p-butoxy benzylidene-p-fluoroaniline. This composition has a nematic range of 0° C. to 51.5° C.

EXAMPLE V

A nematic liquid crystal composition and a device containing the same was prepared using 0.96 gram of p-methoxybenzylidene-p-n-butylaniline (MBBA), 0.25 gram of p-butoxy benzylidene-p-fluoroaniline, 0.12 gram of p-ethoxybenzylidene-p-cyanoaniline and 0.107 gram of p-ethoxy benzylidene-p-methoxyaniline. This composition has a nematic range of −6° to +60° C.

Figure 2:
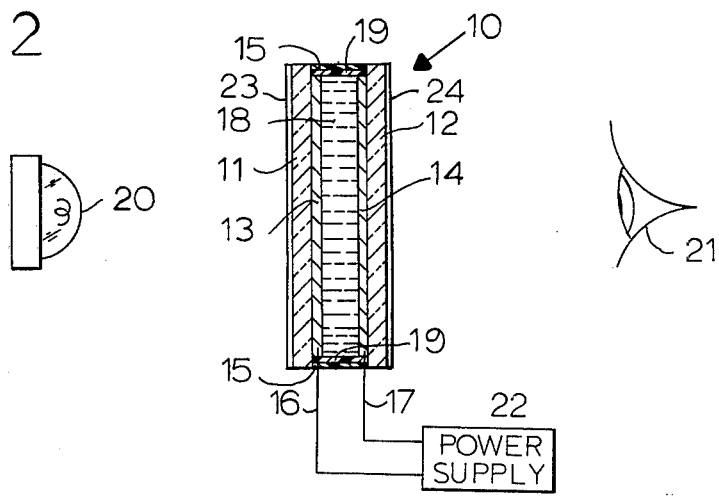
FIG. 2 is a cross-sectional view of a device according to the present invention.

Referring to FIG. 2, the display device 10 is provided with two transparent glass walls 11 and 12 spaced 0.5 mil apart, maintained by a glass frit seal 19. Electrode 13 is disposed at the interior face of wall 11, and electrode 14 at the interior face of wall 12, the electrodes being connected by leads 16 and 17, respectively, to a voltage source such as a battery 22. Within device 10 is a liquid crystal composition 18, for example, such as shown in Example III above. Polarizing films 23 and 24 are placed on the outer surfaces of the glass plates 11 and 12. A light source 20 is disposed opposite wall 11 and the display effected when voltage is applied across the electrodes is observed at 21. It has been found that the field effect compositions made according to this invention have low threshold voltages as compared with typical commercially available liquid crystal compositions.

The field effect compositions produced in Examples III, IV and V were tested against commercially available nematic liquid crystal compositions in a 3½ digit watch display cell. The cell had a thickness of 0.5 mil and was constructed generally as described above with reference to FIG. 2. The following Table illustrates a typical test run.

TABLE

|  | Chisso | La Roche B | Kodak 9443 | B | | |
|---|---|---|---|---|---|---|
|  |  |  |  | 3 | 4 | 5 |
| Average Current | 857 n A | 725 n A | 3610 n A | 130–155 n A | 140 n A | 130–150 n A |

Chisso is the trade name of a Japanese based company which makes a Schiff base liquid crystal composition sold under the trademark Lixon 7101; LaRoche B is the trademark for a Schiff base liquid crystal composition made by Hoffman LaRoche Inc. and Kodak 9443 is the designation for a Schiff base liquid crystal composition made and sold by Eastman Kodak Company.

Figure 1:
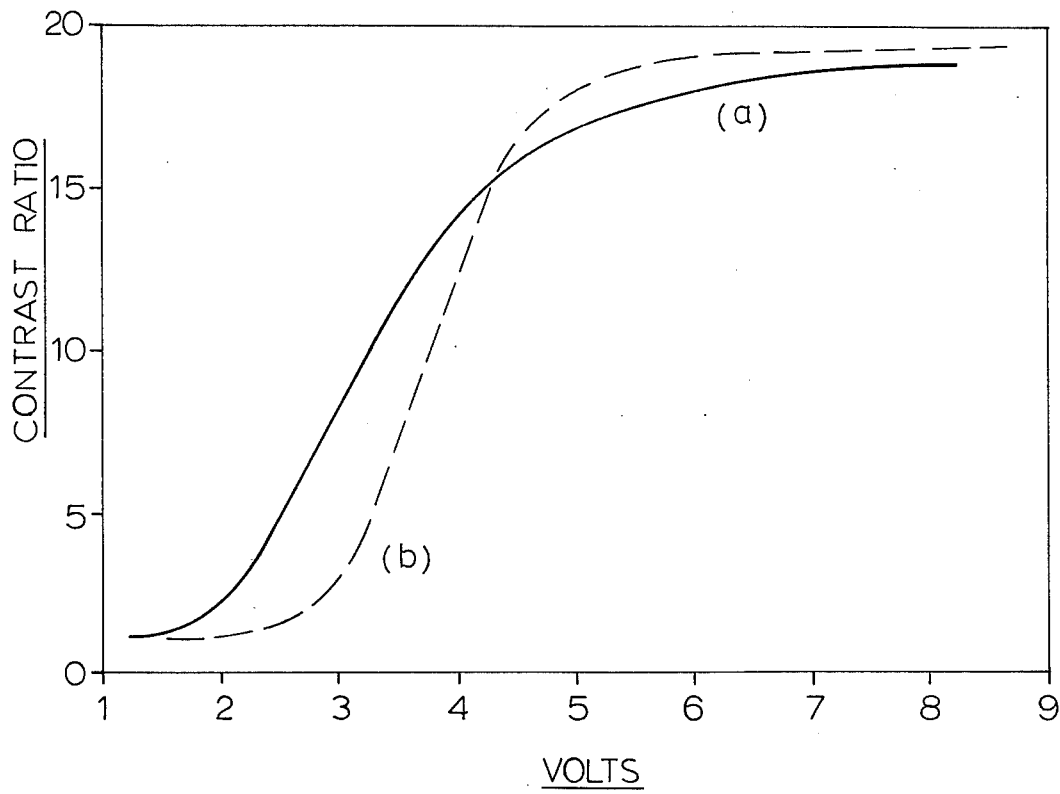
FIG. 1 is a graphical representation of the contrast ratio versus voltage exhibited by a product and device according to this invention as compared with a typical prior art device.

It is clear from the table that compositions B-3, 4 and 5 draw substantially less current than other formulations presently available. Moreover, field effect composition B-5 has a low threshold voltage of 3 volts. The contrast ratio versus voltage of B-5 is compared against a typical 6–9 volt composition. The results are illustrated in FIG. 1.

It will be noted that the liquid crystal composition according to this invention consumes substantially less current even when a cyano-derived Schiff base is present (Example V).

In the above description and in the claims part and percentages, where shown, are by weight unless otherwise indicated. The term "n A" is an abbreviation for nano amperes.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. An electro-optical light-modulating device containing a nematic liquid crystal composition comprising an admixture of 90% to 60% by weight of (A) p-methoxy benzylidene-p-butyl aniline, and 10% to 40% by weight of (B) at least one fluorinated Schiff base having the general formula X — Ph — HC=N—PH — F, wherein X is an alkoxy group having from 1 to 10 carbon atoms, Ph is phenylene and F is fluorine, and means for applying an electric field to said admixture.

2. A device as in claim 1 wherein said fluorinated Schiff base is p-ethoxy benzylidene-p-fluoroaniline.

3. A device as in claim 1 wherein said fluorinated Schiff base is p-butoxy benzylidene-p-fluoroaniline.

4. An electro-optical light-modulating device containing a nematic liquid crystal composition comprising an admixture of 90% to 60% p-methoxy benzylidene-p-n-butylaniline and 10% to 40% p-ethoxy benzylidene-p-fluoroaniline.

5. An electro-optical light-modulating device containing a nematic liquid crystal composition comprising an admixture of 90% to 60% p-methoxy benzylidene-p-n-butylaniline and 10% to 40% p-butoxy benzylidene-p-fluoroaniline.

6. A device as in claim 1 wherein said admixture comprises 0.96 gram p-methoxy benzylidene-p-n-butylaniline, 0.25 gram p-butoxy benzylidene-p-fluoroaniline, 0.12 gram p-ethoxy benzylidene-p-cyanoaniline and 0.107 gram p-ethoxy benzylidene-p-methoxyaniline.

7. A device as in claim 1 wherein said admixture contains about 4 parts by weight of said (A) compound and about 1 part by weight of said fluorinated Schiff base.

8. A nematic liquid crystal composition comprising an admixture of 90% to 60% by weight of (A) p-methoxy-benzylidene-p-butyl aniline and 10% to 40% by weight of (B) at least one fluorinated Schiff base having the general formula X—Ph — H=N — Ph —F, where X is an alkoxy group having from 1 to 10 carbon atoms, Ph is phenylene, and F is fluorine.

9. A composition as in claim 8 wherein said fluorinated Schiff base is p-ethoxybenzylidene-p-fluoroaniline.

10. A composition as in claim 8 wherein said fluorinated Schiff base is p-butoxybenzylidene-p-fluoroaniline.

11. A nematic liquid crystal composition comprising an admixture of 90% to 60% p-methoxybenzylidene-p-n-butylaniline and 10% to 40% p-ethoxybenzylidene-p-fluoroaniline.

12. A nematic liquid crystal composition comprising an admixture of 90% to 60% p-methoxybenzylidene-p-n-butylaniline and 10% to 40% p-butoxybenzylidene-p-fluoroaniline.

13. A composition as in claim 8 wherein said admixture comprises 0.96 gram p-methoxybenzylidene-p-n-butylaniline, 0.12 gram p-ethoxybenzylidene-p-cyanoaniline, 0.107 gram p-ethoxybenzylidene-p-methoxyaniline and 0.25 gram p-butoxybenzylidene-p-fluoroaniline.

14. A composition as in claim 8 wherein said admixture contains from 15% to 40% of said fluorinated Schiff base.

15. A composition as in claim 14 containing about 25% of said fluorinated Schiff base.

16. Method of preparing a liquid crystal composition comprising admixing 90% to 60% by weight of p-methoxy-benzylidene-p-butylaniline and 10% to 40% by weight of at least one fluorinated Schiff base of the formula X — Ph — HC=N — Ph — F, where X is an alkoxy group having from 1 to 10 carbon atoms, Ph is phenylene and F is fluorine, heating said admixture until the solution becomes clear and then cooling to room temperature.

* * * * *

UNITED STATES PATENT AND TRADEMARK OFFICE
CERTIFICATE OF CORRECTION

PATENT NO. : 4,018,507
DATED : April 19, 1977
INVENTOR(S) : N.V. VIJAYA RAGHAVAN It is certified that error appears in the above-identified patent and that said Letters Patent are hereby corrected as shown below:

Col. 1, lines 38, 48, 52, 58 and 64/65, "fluoroaniline" should read --fluorinated--. Col. 2, line 23, "27%" should read --25%--. Col. 6, line 9, "X-Ph-H=N-Ph-F" should read --X-Ph-HC=N-Ph-F--.

Signed and Sealed this

Eighteenth Day of April 1978

[SEAL]

Attest:

RUTH C. MASON
Attesting Officer

LUTRELLE F. PARKER
Acting Commissioner of Patents and Trademarks